United States Patent
Hubby, Jr.

(10) Patent No.: US 7,081,928 B2
(45) Date of Patent: Jul. 25, 2006

(54) OPTICAL SYSTEM FOR FULL COLOR, VIDEO PROJECTOR USING SINGLE LIGHT VALVE WITH PLURAL SUB-PIXEL REFLECTORS

(75) Inventor: Laurence M. Hubby, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 09/859,648

(22) Filed: May 16, 2001

(65) Prior Publication Data

US 2002/0171778 A1    Nov. 21, 2002

(51) Int. Cl.
*H04N 9/31* (2006.01)
*G02F 1/00* (2006.01)

(52) U.S. Cl. ............ 348/760; 348/764; 348/770; 348/771; 348/781; 348/744; 353/30; 353/99; 359/223; 359/295

(58) Field of Classification Search ........ 348/759–760, 348/764, 770–771, 781; 353/30, 99; 359/223–225, 359/295; 345/84, 694; H04N 9/31; G02F 11/00
See application file for complete search history.

(56) References Cited

U.S. PATENT DOCUMENTS

| | | | | |
|---|---|---|---|---|
| 3,981,568 | A | * | 9/1976 | Bartolomei ............... 359/587 |
| 4,615,595 | A | | 10/1986 | Hornbeck |
| 5,013,147 | A | * | 5/1991 | Montes ...................... 352/58 |
| 5,061,049 | A | | 10/1991 | Hornbeck |
| 5,126,836 | A | | 6/1992 | Um |
| 5,410,370 | A | * | 4/1995 | Janssen ..................... 348/756 |
| 5,442,411 | A | * | 8/1995 | Urbanus et al. ........... 348/771 |
| 5,452,024 | A | * | 9/1995 | Sampsell ................... 348/755 |
| 5,532,763 | A | * | 7/1996 | Janssen et al. ............. 348/744 |
| 5,541,473 | A | * | 7/1996 | Duboc et al. .............. 313/422 |
| 5,708,451 | A | * | 1/1998 | Baldi ........................ 345/75.2 |
| 5,729,245 | A | * | 3/1998 | Gove et al. ................ 345/84 |
| 5,808,797 | A | * | 9/1998 | Bloom et al. .............. 359/572 |
| 5,835,256 | A | | 11/1998 | Huibers |
| 5,889,567 | A | * | 3/1999 | Swanson et al. .............. 349/62 |
| 5,903,383 | A | * | 5/1999 | Bernstein et al. ........... 359/298 |
| 5,951,135 | A | * | 9/1999 | Bigelow et al. ............. 353/30 |
| 6,014,121 | A | * | 1/2000 | Aratani et al. .............. 345/89 |
| 6,037,918 | A | * | 3/2000 | Hansen et al. ............ 345/74.1 |

(Continued)

OTHER PUBLICATIONS

"DLP Technology. The Clear Choice for Your Digital Viewing Experience"; www.dlp.com; Apr. 11, 2005; 2 pp.

(Continued)

*Primary Examiner*—Brian P. Yenke

(57) ABSTRACT

A full color video projector system using a light source and a single light valve. The output of the light source passes through a condenser lens. The lens is directed toward a splayed array of red, green, and blue dichroic reflector color filters. The reflected three primary color beams first pass through a lenticular lens array, comprised of a plurality of elongated cylinder lenses, arranged in parallel, co-planar relation. The lenticular array produces color stripe illumination pattern, which is redirected and focused by a relay optic upon a reflective micro-mirror light valve. The light valve includes three sub-pixels for every full-color screen pixel. The pixels are arranged in parallel stripes which correspond to the size and configuration of the color strip illumination pattern outputted by the lenticular array. Light valve address circuitry actuates appropriate sub-pixels to reflect incident light energy, in accordance with corresponding video image information. The light energy reflected by the light valve is directed to a projection lens, and focused upon a screen.

39 Claims, 3 Drawing Sheets

U.S. PATENT DOCUMENTS

| | | | | |
|---|---|---|---|---|
| 6,069,597 A * | 5/2000 | Hansen | ................ | 345/74.1 |
| 6,069,598 A * | 5/2000 | Hansen | ................ | 345/74.1 |
| 6,147,664 A * | 11/2000 | Hansen | ................ | 345/74.1 |
| 6,169,529 B1 * | 1/2001 | Hansen et al. | ............. | 345/74.1 |
| 6,243,149 B1 * | 6/2001 | Swanson et al. | ............. | 349/62 |
| 6,254,237 B1 * | 7/2001 | Booth | ................ | 353/31 |
| 6,288,696 B1 * | 9/2001 | Holloman | ............. | 345/84 |
| 6,292,157 B1 * | 9/2001 | Greene et al. | ............. | 345/1.3 |
| 6,304,263 B1 * | 10/2001 | Chiabrera et al. | ........ | 345/419 |
| 6,346,776 B1 * | 2/2002 | Robinson et al. | ........ | 315/169.3 |
| 6,388,644 B1 * | 5/2002 | De Zwart et al. | ............ | 345/60 |
| 6,452,583 B1 * | 9/2002 | Takeuchi et al. | ............ | 345/108 |
| 6,456,421 B1 * | 9/2002 | Chapnik et al. | ............ | 359/292 |
| 6,457,833 B1 * | 10/2002 | Ishikawa et al. | ............ | 353/99 |
| 6,498,686 B1 * | 12/2002 | Hubby, Jr. | ............ | 359/634 |
| 6,505,939 B1 * | 1/2003 | Bierhuizen et al. | ........ | 353/94 |
| 6,523,961 B1 * | 2/2003 | Ilkov et al. | ............ | 353/99 |
| 6,563,551 B1 * | 5/2003 | Janssen et al. | ............ | 348/759 |
| 6,608,620 B1 * | 8/2003 | Suzuki et al. | ............ | 345/204 |
| 6,639,643 B1 * | 10/2003 | Babuka et al. | ............ | 349/155 |
| 6,661,429 B1 * | 12/2003 | Phan | ............ | 345/694 |
| 6,700,560 B1 * | 3/2004 | Sumiya | ............ | 345/88 |
| 6,796,658 B1 * | 9/2004 | Hubel et al. | ............ | 353/31 |
| 6,943,933 B1 * | 9/2005 | Radominski et al. | ........ | 359/293 |
| 2001/0035714 A1 * | 11/2001 | Lu | ............ | 313/504 |
| 2001/0048493 A1 * | 12/2001 | Swanson et al. | ............ | 349/62 |
| 2002/0000958 A1 * | 1/2002 | Ho et al. | ............ | 345/84 |
| 2002/0008809 A1 * | 1/2002 | Babuka et al. | ............ | 349/73 |
| 2002/0008812 A1 * | 1/2002 | Conner et al. | ............ | 349/106 |
| 2003/0103047 A1 * | 6/2003 | Chiabrera et al. | ........ | 345/419 |
| 2004/0218154 A1 * | 11/2004 | Huibers | ............ | 353/97 |

OTHER PUBLICATIONS

"Who Says You Can't Be Cutting-Edge and Tried and True?"; http://www.dlp.com/dlp_technology/dlp_technology_overview.asp; Apr. 11, 2005; 4 pp.

* cited by examiner

OPTICAL SYSTEM FOR FULL COLOR, VIDEO PROJECTOR USING SINGLE LIGHT VALVE WITH PLURAL SUB-PIXEL REFLECTORS

BACKGROUND OF THE INVENTION

1. Field of the Invention

The invention relates generally to optical systems for large screen, video projectors. More specifically, the invention pertains to a full color illumination system for a video projector, in which a single light valve including a plurality of primary color, sub-pixel reflectors, effects the selective illumination of full color pixels on a projector screen.

2. Description of the Prior Art

Existing optical systems for light valve type video projectors typically use a single light source, such as an arc lamp, to provide illumination for the projection screen. The output of the light source is first subjected to color separation, so that individual red, green, and blue beams are produced. The separated color beams are then directed to respective light valves, and the resultant illumination from each of the three light valves is recombined for projection upon a screen. The optics used to accomplish the color separation, the information modulation of each color beam by the plural light valves, and the recombination of the three beams can be complex and expensive to implement. Moreover, owing to the additional components required for multiple light valve systems, they remain inefficient, in terms of the intensity of the light transmitted through the system and ultimately projected onto the screen.

Consequently, the need exists for an optical illumination system which is simple, yet efficient, in producing a full color image for a video projection system.

The need also exists for an optical illumination system which uses only a single light valve to control the three primary color beams used in a video projection system.

The need also exists for a single light valve optical system which is inexpensive to manufacture, yet provides luminance and image quality comparable to that provided by more expensive three light valve systems.

SUMMARY OF THE INVENTION

The full color video projector system of the present invention uses a conventional light source, in combination with a plurality of splayed, dichroic reflectors, a lenticular lens array, a relay optic, a single micro-mirror, light valve having a plurality of sub-pixel reflectors, a projection lens, and a projection screen.

The light source preferably has a full spectrum output, such as that provided either by an arc lamp, or by a plurality of light emitting diodes, or by a plurality of laser beam generators. The output of the light source is converged, as it passes through a condenser lens. The converged light beam is directed in a first direction toward an array of red, green, and blue dichroic reflective, color filters. The color filters are arranged in splayed relation, with small, equal angles, between the planes of adjacent filters. These filters selectively reflect one color, and pass the remaining portion of the light spectrum. This arrangement permutes the incoming full spectrum light beam, so that three separate and slightly converging beams are produced, each beam corresponding in wavelength to the red, green, and blue primary colors. These reflective color filters also redirect the three beams, so they are now generally headed in a second direction.

The condenser lens focuses the reflected and redirected three primary color beams through a transversely positioned, lenticular lens array. This array is comprised of a plurality of elongated cylinder lenses, arranged in parallel, co-planar relation. The lenticular array produces a repetitive, illumination pattern of three primary color stripes, focused downstream at a focal plane.

An aperture, farther downstream, blocks laterally diverging portions of the illuminating beam, so the acceptance angle of downstream optics will not be exceeded. By eliminating this extraneous light, a high contrast in the projected image is maintained.

The illuminating beam is again focused by a downstream relay optic. The relay optic also redirects the pattern in a third direction, upon a single, micro-mirror light valve. The relay optic is positioned between the focal plane and the light valve, to provide a one-to-one ratio between the original illuminating pattern and the pattern relayed upon the light valve.

The light valve includes a plurality of full-color screen pixels. The pixels are arranged in rows and columns which correspond to the size, configuration, and order of the color strip illumination pattern outputted by the lenticular array. Each of the full-color pixels includes three sub-pixel, micromirror reflectors. Each sub-pixel within a full-color pixel is dedicated to reflecting either red, green, or blue incident beams.

Light valve address circuitry actuates appropriate sub-pixels to reflect incident light energy, either in a fourth direction or a fifth direction, in accordance with corresponding video image information. If a sub-pixel is actuated, the incident light energy is reflected in the fourth direction to a projection lens. The projection lens then focuses this illuminating sub-pixel upon a projection screen. If a sub-pixel is not actuated, the incident light energy is reflected in the fifth direction, away from the projection lens and the screen.

DETAILED DESCRIPTION OF THE PREFERRED EMBODIMENT

Figure 1:
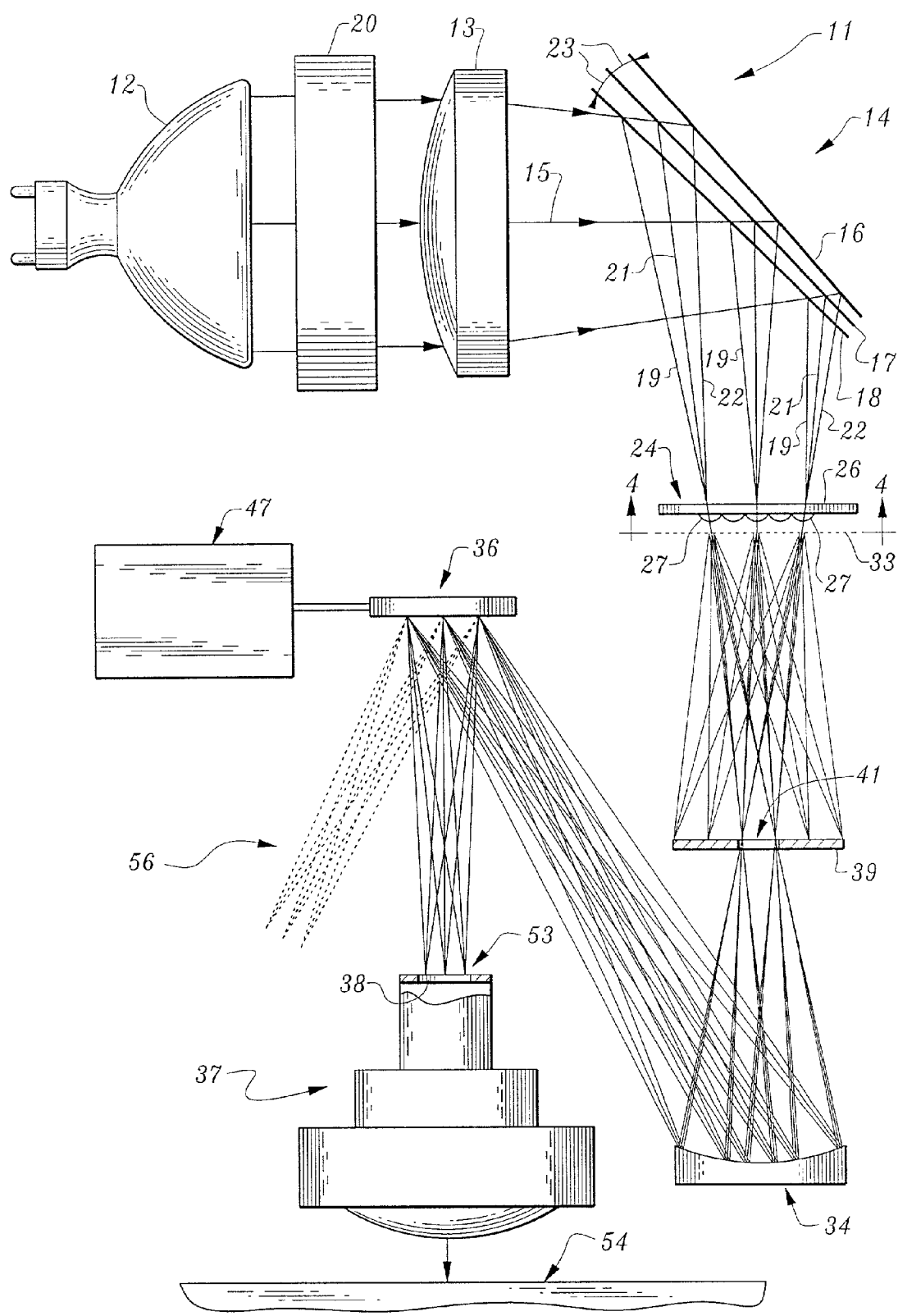
FIG. 1 is a diagrammatic view of the major components of optical system of the present invention, showing representative groupings of light beams as they are generated, permuted, focused, and modulated as they pass through the system.

Turning now to FIG. 1, the optical system 11 of the present invention uses a light source 12, preferably having a full spectrum output. Light source 12 may be an arc lamp, as shown, or any other equivalent illuminator. Examples would include a plurality of light emitting diodes, or an appropriate combination of laser beam generators. The output beam of the light source passes in a first direction through a light integrator 20. The purpose of integrator 20 is to disperse the output of source 12, so it is substantially the same in intensity across the entire width of the beam. This integrator may be of conventional design, such as that manufactured by the Epson Corporation of Japan, and which is used in the Epson PowerLite 5000 or 7000 Series, Multi-Media Projectors.

The output of the integrator 20 is then focused in the same first direction by a condenser lens 13. The focused light wave output 15 encounters a splayed reflector array 14, comprised of a blue dichroic reflective filter 16, a green dichroic reflective filter 17, and a red dichroic reflective filter 18. As shown in FIG. 1, the red filter 18, reflects a red light beam 19, but passes a green light beam 21 and a blue light beam 22. The green filter 17 reflects at least the green light beam 21, but passes the blue light beam 22. The blue filter 16 reflects at least the blue light beam 22, but it may be a full spectrum reflector as well. As will become more apparent herein, the particular order of these beams is entirely arbitrary, and it is only necessary that downstream components be correspondingly ordered for the optical system to operate properly.

The dichroic reflective filters are splayed apart a small, predetermined separation angle 23, to produce a plurality of discrete color beams, each one of a primary color, propagating at the same angle with respect to the adjacent primary color beam. Generally, the angular interval between these beams should be the same, and the angle should be approximately 1/nth of the acceptance angle of downstream optics, where n is the number of primary colors.

Dichroic reflective filters are preferred for this application because they selectively pass and reflect particular wavelengths based upon interference, rather than by absorption. This increases the overall light output efficiency of the optical system herein. Suitable dichroic reflective filters are manufactured by OCLI Inc., of Santa Rosa, Calif., under the product designation "Colorband Color Separation Filters.".

The separate and converging, red, green, and blue primary color beams impinge upon a lenticular array 24. Lenticular array 24 is comprised of a transparent substrate 26, upon which a plurality of elongated cylinder lenses 27 is arranged in parallel, co-planar relation. For purposes of clarity, only a representative number of lenses 27 is shown in the drawings. A practical system would have many more such lenses, consistent with the resolution requirements for the system.

Figure 2:
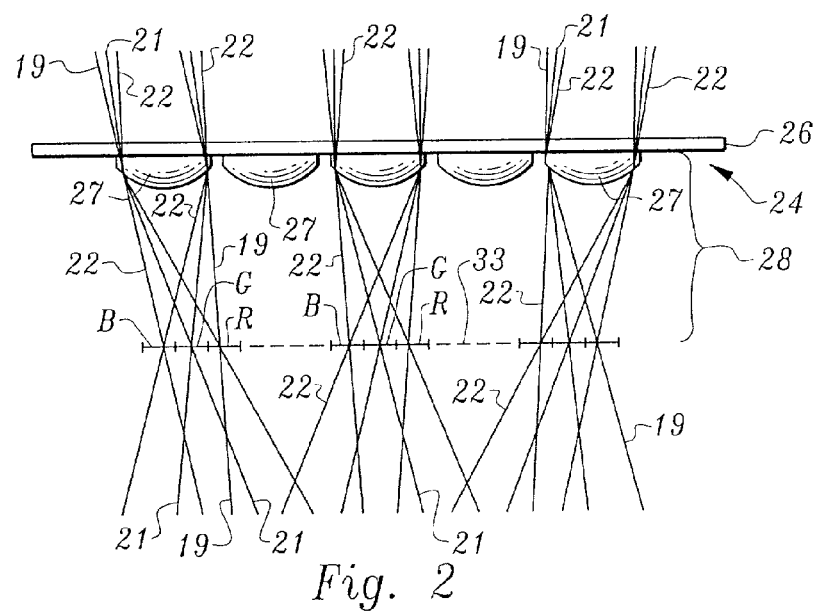
FIG. 2 is a top plan view of the lenticular array, taken to an expanded scale, showing the downstream focal plane in which the illumination pattern of primary colors lies.
Figure 4:
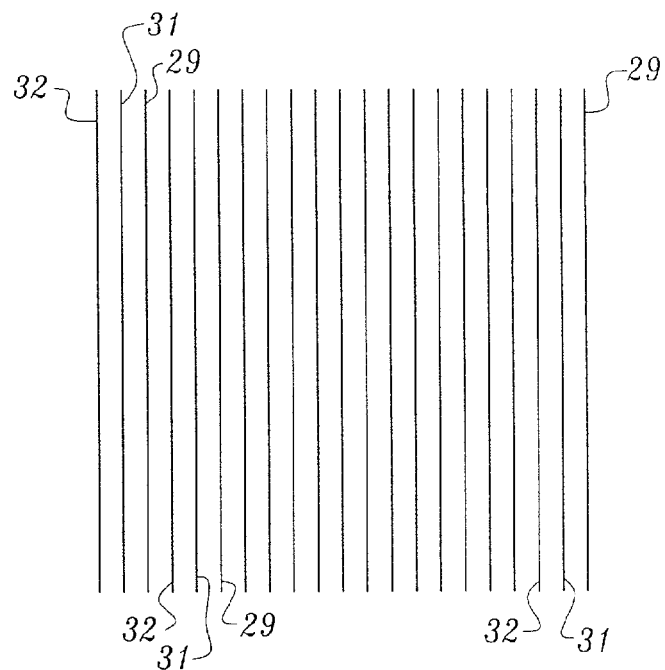
FIG. 4 is a front elevational view taken on the line 4—4 in FIG. 1, showing the repetitive pattern of groups of three color stripes, each stripe corresponding a respective one of the primary colors, present in the focal plane downstream from the lenticular array; and, FIG. 5 is a front elevational view of the light valve and associated control and drive circuitry, the light valve including a plurality of pixels, with each pixel comprised of three sub-pixel, micro-mirror reflectors.

Cylinders 27 have a focal length 28, such that the incident red, green and blue primary color beams are focused to form corresponding and repetitive, striped color patterns. As shown in FIG. 4, these patterns appear as red stripes 29, green stripes 31, and blue stripes 32, all lying in an illumination stripe focal plane 33. The resultant repetitive pattern of primary color stripes is best appreciated in FIG. 4, which represents a front elevational view of the stripe focal plane 33. These same stripes are identified in FIG. 2, by the letters B, G, and R, corresponding to blue, green and red stripes. It should be noted that having passed through the lenticular array 24, the order of the beams within each primary color beam grouping is now reversed.

The optical characteristics of the lenticular array 24 must cooperate with the optics of the upstream components, so as to produce illumination stripes in the focal plane, which are sized to be nearly contingent, with little or no darkened zone between adjacent stripes. It is fundamental that there will be a finite width to each color stripe produced in the focal plane of the array, owing to the angular spread characteristic of the light source. However, because each lens 27 must concurrently pass the three primary colors in physically separated fashion, an unavoidable result is that the light is also spread out over three times the angle necessary to pass a monochromatic beam. This is to be contrasted to the operation of the prior art systems, which need only pass one monochromatic beam at a time, through the use of a color wheel or other sequential light frequency illuminator.

This angular spread of the striped illumination pattern presents unique implementation requirements for the optical components downstream from the lenticular array 24. For example, the present system 11 employs a relay optic 34, a micro-mirror light valve 36, and a projection lens 37, all downstream from array 24. The acceptance half-angle of the relay optics is preferably chosen to match that of the projection lens 37. Light which falls outside this acceptance half-angle will no the passed through the system to the projected image owing to an optical stop within the system. In the present system, a first optical stop 38 is provided for that purpose, within the projection lens 37. As a further implementation requirement, where the projection system, as here, uses micro-mirror light valve, the maximum value for the acceptance half-angle cannot-exceed the range of motion of the micro-mirrors.

Figure 3:
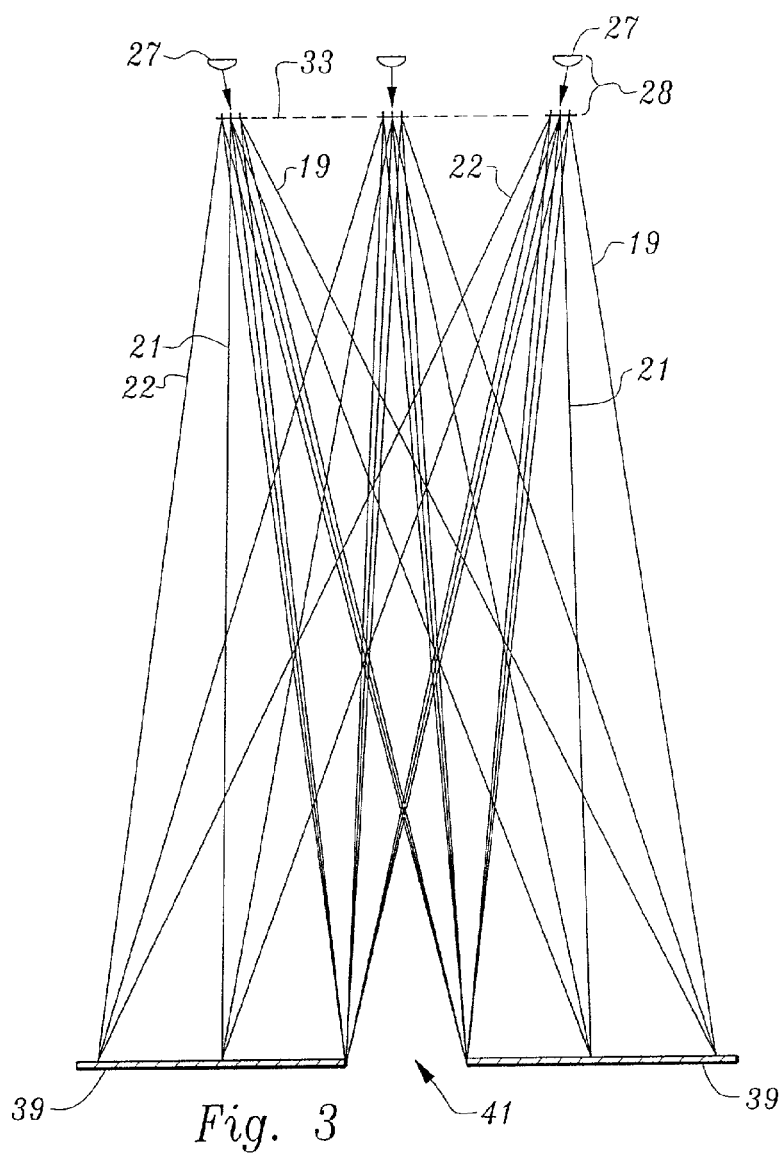
FIG. 3 is a diagrammatic view of a region immediately downstream from the focal plane, showing how lateral portions of the color beams are selectively blocked by an aperture.

To address these issues, the present system employs an second optical stop 39, interposed between the lenticular array 24 and the relay optic 34. Second stop 39 includes an aperture 41 sized for the passage of only certain portions of the illumination outputted from the lenticular array 24. As shown most clearly in FIG. 3, aperture 41 passes the left-hand, ⅓ portion of the red beams 19, the center ⅓ portion of the green beams 21, and the right-hand, ⅓ portion of the blue beams 22. The remaining portions of the beams are blocked by the stop 39, and are thereby prevented from passing through the downstream optical components. Although this results in a loss of ⅔ of the output of the lenticular array, the net output is the same as that for a single color system using a color wheel.

Returning now to FIG. 1, the incident composite of the color stripe illumination outputted by the lenticular array 24 is redirected in a third direction and focused by the relay optic 34 upon the single, micro-mirror light valve 36. Although the relay optic 34 shown in FIG. 1 contains at least one reflective element, any type of imaging optics may be used, such as refractive, diffractive, or combinations thereof. A characteristic of the relay optic is that it images the stripes in the focus plane 33 onto the plane of the light valve 36 in a 1:1 ratio, in reversed relation As will be explained in more detail below, the use of this ratio ensures that the color stripes produced by the lenticular lens are properly aligned with corresponding reflective elements within the light valve 36.

Figure 5:
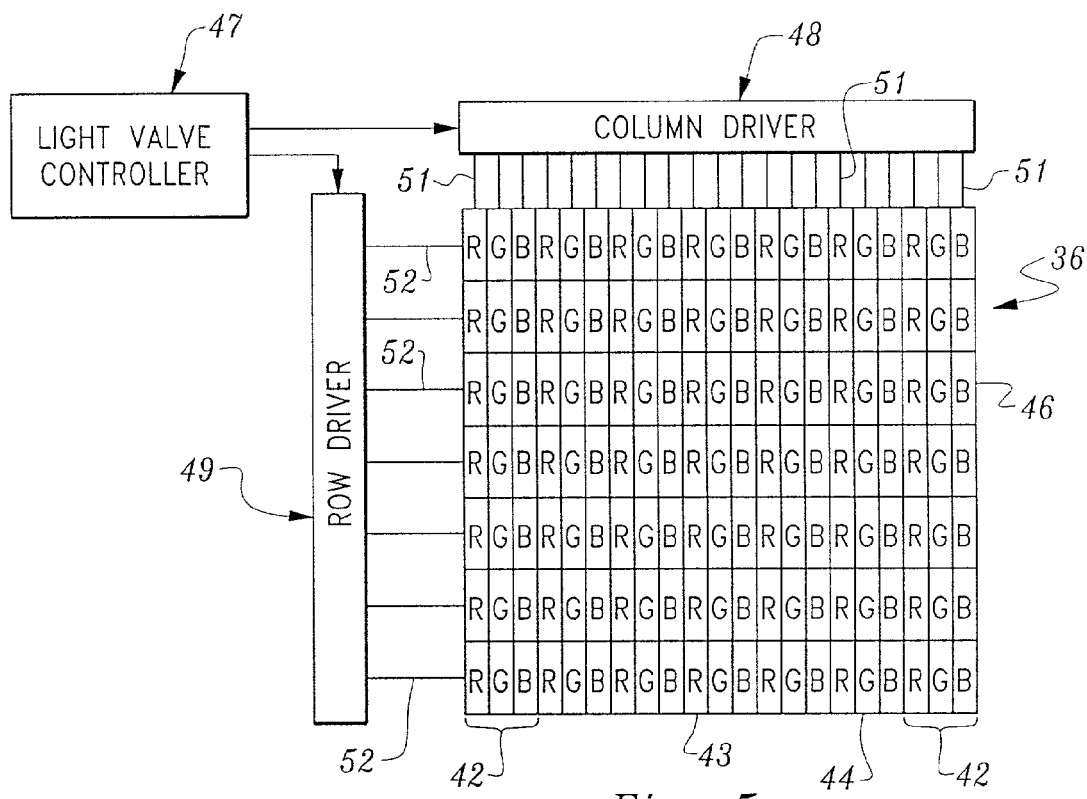

The light valve 36 includes a plurality of full-color screen pixels 42, arranged either in rows or in columnar stripes, depending upon the orientation of the components of the optical system 11. The screen pixels 42 in the preferred embodiment shown in FIG. 5 are arranged in parallel, vertical stripes. Each screen pixel 42 includes a red sub-pixel 43, a green sub-pixel 44, and a blue sub-pixel 46.

The sub-pixels 43, 44, and 46 are generally rectangular in configuration, and sized so that when three sub-pixels are grouped side-to-side, it results in a square shape for the corresponding screen pixel 42. Furthermore, these sub-pixels are sized, configured, and ordered, so they correspond exactly to the color stripe illumination outputted by the lenticular array 24. And, the overall shape and dimensions of the light valve 36 correspond closely to that of the color stripe pattern at the focal plane 33, as well.

As a result of the identity between the physical attributes of the color stripe illumination pattern and the screen pixel and sub-pixel arrangement in the light valve 36, there is perfect alignment and correspondence between the color stripes and the respective color sub-pixels in the light valve. As will be explained below, this correspondence ensures that the stripe image displayed on the light valve 36 will be appropriately modulated from the full color image information provided to each of the sub-pixels.

As shown in FIG. 5, a light valve controller 47 is connected to a column driver 48 and a row driver 49. Each micro-mirror sub-pixel has two electrical connections. Column drive lines 51 are provided, to contact one of these two connections, for every sub-pixel in each respective column. Similarly, row drive lines 52 extend from row driver 49, to interconnect to the other of the two connections for every sub-pixel. In response to video data, the light valve controller 47 actuates a particular sub-pixel by energizing the single row and the single column drive lines which contact the selected sub-pixel. All of the sub-pixels in the light valve are addressed and "refreshed", by continuously stepping through the rows and columns with energizing signals. Typically, the addressing circuitry contains row and column drive circuitry which incorporates memory, allowing the addressing to be completed a row or column at a time, in order to speed up the "refresh" operation. In this manner, the pixels receiving illumination of a given primary color are properly driven by the light valve controller 48 so that the correct image information will be reflected from each pixel.

Light valve 36 may include any type of micro-mirror construction, such as those which operate by means of electrostatic forces, or upon forces generated by energized piezoelectric material. The construction and operation of such micro-mirror light valves, usable in practicing the present invention, are well known to those of ordinary skill in the art, and need not be described in great detail herein. For example, one type of micro-mirror light valve is taught in U.S. Pat. Nos. 4,615,595 and 5,061,049, assigned to Texas Instruments Incorporated, of Dallas, Tex. The '595 and '049 patents describe electrostatically deflected micro-mirrors in a spatial light modulator. A second type of spatial light valve or modulator, showing micro-mirrors suspended by torsion hinges and deflected by electrostatic forces, is disclosed in U.S. Pat. No. 5,835,256, assigned to Reflectivity, Inc. of Palo Alto, Calif. Yet another type of light valve, employing reflective surfaces deformable by excited piezoelectric crystals, is shown in U.S. Pat. No. 5,126,836, assigned to Aura Systems, Inc. of El Segundo, Calif.

Irrespective of the particular mechanism for moving, deflecting, or reorienting its micro-mirrors, each light valve or light modulator works in generally the same manner. Each of the movable micro-mirrors is capable of selectively reflecting, and thereby modulating, incident illumination. Each micro-mirror has a first state, or orientation, and a second state or orientation. Typically, the difference in angular orientation of the micro-mirror, between the first and second states, is in the range of 10 to 20 degrees. In the first state, usually referred to as the "ON" state, the actuated micro-mirror reflects light beams in a fourth direction, in this case toward an input port 53 of the projection lens 37. Thereafter, the light beams pass through the optical stop 38, and are focused upon a projection screen 54 to produce the illuminated portion of a video image.

In the second state of the micro-mirror, termed the "OFF" state, selected light beams are reflected from one or more sub-pixels of the light valve 36 in a fifth direction, so they will not impinge upon the projection screen. The broken line representation of the color beams represented by the numeral 56, shows the general orientation of the beams when they are headed in the fifth direction. With the beam or beams so deflected, the corresponding sub-pixel area on the projection screen remains dark, until such time as the respective sub-pixel is again actuated. The combination of the illuminated and the dark sub-pixel areas on the projection screen produces the composite video image.

It will be appreciated then, that I have described an improved optical system for a full color video projector. I have also described a light valve construction including a plurality of full color pixels, each pixel having separate red, green, and blue sub-pixel reflectors. The optical system herein including the single light valve construction, exhibits image resolution and brightness comparable to that provided by more complex and more costly prior art systems.

What is claimed is:

1. A full color video projector system comprising:
   a. a light source, producing a full spectrum beam in a first direction;
   b. a splayed array of red, green, and blue dichroic reflector color filters, said splayed array being located downstream from said light source and being arranged so as to split said beam into red, green, and blue beam components and re-direct them in a second direction;
   c. a lenticular lens array, said array being transverse to said beam components traveling in said second direction, said lens array comprised of a plurality of elongated cylindrical lenses, said cylindrical lenses being arranged in parallel, co-planar relation, each of said lenses outputting a red, green, and blue color stripe illumination pattern at a lens array focal plane;
   d. a relay optic downstream from said lens array focal plane in said second direction, redirecting an incident composite of said red, green, and blue illumination pattern in a third direction;
   e. a reflective micro-mirror light valve downstream from said relay optic in said third direction, said light valve including three sub-pixels for every full-color screen pixel in a full color video image, said screen pixels being arranged in parallel stripes which correspond to the size and configuration of said color stripe illumination pattern outputted by said lenticular lens array, each of said sub-pixels having an actuated state in which at least a portion of said color stripe illumination pattern is reflected in a fourth direction, and an unactuated state in which at least a portion of said color stripe illumination pattern is reflected in a fifth direction;
   f. a projection lens, said projection lens having an input port directed toward said light valve, and an output port directed toward and focused upon a projection screen; and,
   g. light valve address circuitry interconnected to each of said sub-pixels, said address circuitry actuating appropriate sub-pixels to redirect corresponding portions of said color stripe illumination pattern in said fourth direction and upon said input port of said projection lens, in accordance with corresponding video image information.

2. A projector system as in claim 1 further including an optical stop between said focal plane and said relay optic in said second direction, said optical stop having an aperture sized to pass selected portions of said red, green and blue beam components.

3. A projector system as in claim 2 in which said selected portions are approximately ⅓ of each said red, green, and blue beam components.

4. A projector system as in claim 1, further including a condenser lens, said lens being located downstream from said light source so as to focus said beam in said first direction.

5. A projector system as in claim 1, in which said light source is an arc lamp.

6. A projector system as in claim 1, in which said red and green color filters are splayed apart a predetermined angle, and said green and blue color filters are splayed apart said predetermined angle.

7. A projector system as in claim 1, in which said relay optic contains at least one reflective element, and is located approximately mid-way between said focal plane and said light valve.

8. A projector system as in claim 1 in which said optical relay images said color stripe illumination pattern on said light valve in a 1:1 ratio.

9. A projector system as in claim 1 in which said light valve address circuitry includes a light valve controller connected to a column driver and a row driver, and in which said column driver is connected to one connection on each of said sub-pixels, and in which said row driver is connected to another connection on each of said sub-pixels.

10. A full color video projector system comprising:
    a. light means for producing a full spectrum beam in a first direction;
    b. means downstream from said light means for splitting said beam into red, green, and blue beam components, and for re-directing them in a second direction;
    c. means for outputting a red, green, and blue color stripe illumination pattern at a focal plane, said outputting means being transversely positioned to said beam components traveling in said second direction;
    e. optical relay means downstream from said lens array focal plane in said second direction, for redirecting an incident composite of said red, green, and blue illumination pattern in a third direction;
    f. light valve means downstream from said relay means in said third direction, for alternatively reflecting at least a portion of said color stripe illumination pattern either in a fourth direction or in a fifth direction;
    h. a projection lens, said projection lens having an input port directed toward said light valve means, and an output port directed toward and focused upon a projection screen; and,
    g. means controlling said tight valve means, for reflecting at least a portion of said color stripe illumination pattern in said fourth direction, upon said input port of said projection lens, in accordance with modulation information corresponding to a video image.

11. A projector system as in claim 10 in which said optical relay means contains at least one reflective element.

12. A projector system as in claim 10 in which said optical relay means images said color stripe illumination pattern on said light valve means 1:1 ratio.

13. A projector system as in claim 10 in which said tight valve means includes a plurality of full-color screen pixels corresponding to a full color video image, said screen pixels being arranged in parallel stripes which correspond to the size and configuration of said color stripe illumination pattern.

14. A projector system as in claim 13 in which each of said screen pixels includes three sub-pixels, each of said sub-pixels having an actuated state in which at least a portion of said color stripe illumination pattern is reflected in said fourth direction, and an unactuated state in which at least a portion of said color stripe illumination pattern is reflected in said fifth direction.

15. A projector system as in claim 10, in which said light means is an arc lamp.

16. A projector system as in claim 10 further including an optical stop between said focal plane and said relay optic means in said second direction, said optical stop having an aperture sized to pass selected portions of said red, green and blue beam components.

17. A projector system as in claim 16 in which said selected portions are approximately ⅓ of each said red, green; and blue beam components.

18. A reflective micro-mirror light valve, comprising: a plurality of full-color screen pixels, said screen pixels being arranged end to end to form parallel stripes, said parallel stripes corresponding to the size and configuration of a color stripe illumination pattern, each of said screen pixels including three sub-pixels, said sub-pixels including a reflective surface having an actuated state in which at least a portion of said color stripe illumination pattern is reflected in one direction, and an unactuated state in which at least a portion of said color stripe illumination pattern is reflected in another direction; and
    wherein the parallel stripes collectively have a size substantially equal to the size of the color stripe illumination pattern lying within an illumination stripe focal plane upstream of the reflective micro-mirror light valve.

19. A light valve as in claim 18 further including light valve address circuitry interconnected to each of said sub-pixels, said address circuitry actuating appropriate sub-pixels in accordance with data corresponding to a video image.

20. A light valve as in claim 19, in which said light valve address circuitry includes a light valve controller connected to a column driver and a row driver, and in which said column driver is connected to one connection on each of said sub-pixels, and in which said row driver is connected to another connection on each of said sub-pixel.

21. A light valve as in claim 18 wherein the one and the another directions are the only directions in which light of the color stripe illumination pattern is reflected by the reflective micro-mirror light valve.

22. A light valve as in claim 18 wherein individual ones of the sub-pixels are configured to reflect only one color of the color stripe illumination pattern during all operations of the reflective micro-mirror light valve.

23. A light valve as in claim 18 wherein individual ones of the full-color screen pixels are configured to simultaneously reflect light of the color stripe illumination pattern having at least two different colors.

24. A light valve as in claim 18 wherein individual ones of the full-color screen pixels are configured to simultaneously reflect light of the color stripe illumination pattern having three different colors.

25. A light valve as in claim 18 wherein the color stripe illumination pattern comprises a plurality of different colors which are repetitively alternated in a common direction at a moment in time.

26. A light valve as in claim 25 wherein light of the alternating different colors of the color stripe illumination pattern is simultaneously present during operation of the reflective micro-mirror light valve.

27. A light valve as in claim 25 wherein an ordering of the different colors does not change during all operations of the reflective micro-mirror light valve.

28. A light valve as in claim 18 wherein an area defined by all of the full-color screen pixels of the reflective micro-mirror light valve is substantially equal to an area of the color stripe illumination pattern within the illumination stripe focal plane upstream of the reflective micro-mirror light valve.

29. A light valve as in claim 28 wherein the color stripe illumination pattern is generated prior to being reflected by the sub-pixels.

30. A light valve as in claim 18 wherein the parallel stripes of the full-color screen pixels correspond to the color stripe illumination pattern upstream from the reflective micro-mirror light valve.

31. A light valve as in claim 18 wherein a plurality of the sub-pixels individually reflect light of the same color during all operations of the reflective micro-mirror light valve wherein light is reflected to create an image.

32. A light valve as in claim 18 wherein the color stripe illumination pattern is generated prior to being reflected by the sub-pixels.

33. A light valve as in claim 18 wherein the colors reflected at a given moment in time are different for all immediately adjacent ones of the sub-pixels located in a common direction.

34. A light valve as in claim 18 wherein the full-color screen pixels individually comprise a substantially square shape and respective ones of the sub-pixels of an individual full-color screen pixel comprise substantially rectangular shapes collectively corresponding to the substantially square shape of the respective individual full-color screen pixel.

35. A light valve as in claim 18 wherein the color stripe illumination pattern is generated prior to being reflected by the sub-pixels.

36. A light valve as in claim 18 wherein the full-color screen pixels comprise full-color screen pixels of a single chip.

37. A reflective micro-mirror light valve, comprising: a plurality of full-color screen pixels, said screen pixels being arranged end to end to form parallel stripes, said parallel stripes corresponding to the size and configuration of a color stripe illumination pattern, each of said screen pixels including three sub-pixels, said sub-pixels including a reflective surface having an actuated state in which at least a portion of said color stripe illumination pattern is reflected in one direction, and an unactuated state in which at least a portion of said color stripe illumination pattern is reflected in another direction; and wherein an area defined by all of the full-color screen pixels of the reflective micro-mirror light valve is substantially equal to an area of the color stripe illumination pattern within an illumination stripe focal plane upstream of the reflective micro-mirror light valve.

38. A light valve as in claim 37 wherein the color stripe illumination pattern is generated prior to being reflected by the sub-pixels.

39. A reflective micro-mirror light valve, comprising: a plurality of full-color screen pixels, said screen pixels being arranged end to end to form parallel stripes, said parallel stripes corresponding to the size and configuration of a color stripe illumination pattern, each of said screen pixels including three sub-pixels, said sub-pixels including a reflective surface having an actuated state in which at least a portion of said color stripe illumination pattern is reflected in one direction, and an unactuated state in which at least a portion of said color stripe illumination pattern is reflected in another direction; and wherein the color stripe illumination pattern is generated prior to being reflected by the sub-pixels.

\* \* \* \* \*